United States Patent
Wong et al.

(10) Patent No.: US 11,070,458 B2
(45) Date of Patent: Jul. 20, 2021

(54) ENCRYPTED TRAFFIC ANALYSIS CONTROL MECHANISMS

(71) Applicant: Cisco Technology, Inc., San Jose, CA (US)

(72) Inventors: Pok Wong, Santa Clara, CA (US); Venkataramana Ragothaman, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 44 days.

(21) Appl. No.: 16/037,511

(22) Filed: Jul. 17, 2018

(65) Prior Publication Data
US 2020/0028771 A1  Jan. 23, 2020

(51) Int. Cl.
*H04L 12/851* (2013.01)
*H04L 29/06* (2006.01)
*H04L 12/26* (2006.01)

(52) U.S. Cl.
CPC ............ *H04L 43/18* (2013.01); *H04L 43/067* (2013.01); *H04L 47/2441* (2013.01); *H04L 63/0428* (2013.01)

(58) Field of Classification Search
CPC ... H04L 43/18; H04L 43/067; H04L 47/2441; H04L 63/0428
See application file for complete search history.

(56) References Cited

U.S. PATENT DOCUMENTS

| | | | |
|---|---|---|---|
| 8,543,523 B1 * | 9/2013 | Palit | G06Q 30/0202 706/12 |
| 8,644,151 B2 | 2/2014 | Foschiano | |
| 8,661,556 B2 * | 2/2014 | Smith | H04L 63/20 726/28 |
| 9,071,526 B2 | 6/2015 | Avdanin et al. | |
| 9,294,558 B1 | 3/2016 | Vincent et al. | |

(Continued)

OTHER PUBLICATIONS

Velan, et al. A survey of methods for encrypted traffic classification and analysis. Jul. 15, 2015. International Journal of Network Management. Int. J. Network Mgmt 2015; 25:355-374 Published online Jul. 15, 2015 in Wiley Online Library (wileyonlinelibrary.com). DOI: 10.1002/nem.1901 (Year: 2015).*

Gao, et al., "Performance Evaluation of NETCONF Protocol in MANET Using Emulation", Software Engineering Research, Management and Applications, Studies in Computational Intelligence 654, pp. 11-32, 2016, Springer International Publishing Switzerland.

(Continued)

*Primary Examiner* — Uzma Alam
(74) *Attorney, Agent, or Firm* — Behmke Innovation Group LLC; Kenneth J. Heywood; Jonathon P. Western

(57) ABSTRACT

In one embodiment, a service monitors collection of telemetry data by a telemetry exporter in a network. The telemetry exporter collects the telemetry data from a plurality of interfaces via which a plurality of encrypted traffic flows flow. The telemetry exporter also sends the collected telemetry data to a traffic analysis service for analysis. The service determines that a cost associated with the collection of the telemetry data by the telemetry exporter exceeds a cost threshold. The service selects a subset of the interfaces from which telemetry data is to be captured by the telemetry exporter, based in part on a determination that the cost associated with the collection of the telemetry data exceeds the cost threshold. The service controls the telemetry exporter to collect telemetry data from a subset of the plurality of encrypted traffic flows that use the selected subset of interfaces.

18 Claims, 9 Drawing Sheets

(56) References Cited

U.S. PATENT DOCUMENTS

| | | | |
|---|---|---|---|
| 9,407,560 B2 | 8/2016 | Crisan et al. | |
| 2003/0097595 A1* | 5/2003 | Partridge | H04L 63/1408 726/4 |
| 2009/0013175 A1* | 1/2009 | Elliott | H04L 63/0428 713/154 |
| 2013/0151423 A1* | 6/2013 | Schmidt | G06F 16/215 705/306 |
| 2013/0275569 A1* | 10/2013 | Calo | H04L 29/08072 709/223 |
| 2015/0163318 A1* | 6/2015 | Bergman | H04L 67/2842 709/213 |
| 2016/0192041 A1* | 6/2016 | Pryor | H04Q 9/00 340/870.07 |
| 2017/0132853 A1* | 5/2017 | Matos | H04W 48/20 |
| 2018/0077049 A1* | 3/2018 | Paul | H04L 43/0888 |
| 2018/0144356 A1* | 5/2018 | Holman | G06Q 30/0204 |
| 2018/0278629 A1* | 9/2018 | McGrew | H04L 63/145 |
| 2018/0293885 A1* | 10/2018 | Lee | G08G 1/091 |

OTHER PUBLICATIONS

McGrew, et al., "Understanding network traffic through Intraflow data", https://resources.sei.cmu.edu/asset_files/Presentation/2016_017_001_450411.pdf, FloCon 2016, 33 pages, 2016, Cisco.

"Encrypted Traffic Analytics", https://www.cisco.com/c/dam/en/us/solutions/collateral/enterprise-networks/enterprise-network-security/nb-09-encrytd-traf-anlytcs-wp-cte-en.pdf, Cisco public—White paper, 9 pages, 2018, Cisco.

"Flow Samplers", Flexible Netflow Configuration Guide, Cisco IOS Release 15M&T, https://www.cisco.com/c/en/us/td/docs/ios-xml/ios/fnetflow/configuration/15-mt/fnf-15-mt-book/use-fnflow-redce-cpu.html#d57469e242a1635, 6 pages, 2018, Cisco.

Lear et al. "Manufacturer Usage Description Specification draft-ietf-opsawg-mud-20" Network Working Group; Apr. 9, 2018; pp. 1-58.

Lear et al. "Manufacturer Usage Description Specification draft-ietf-opsawg-mud-07" Network Working Group; Jul. 3, 2017; pp. 1-46.

* cited by examiner

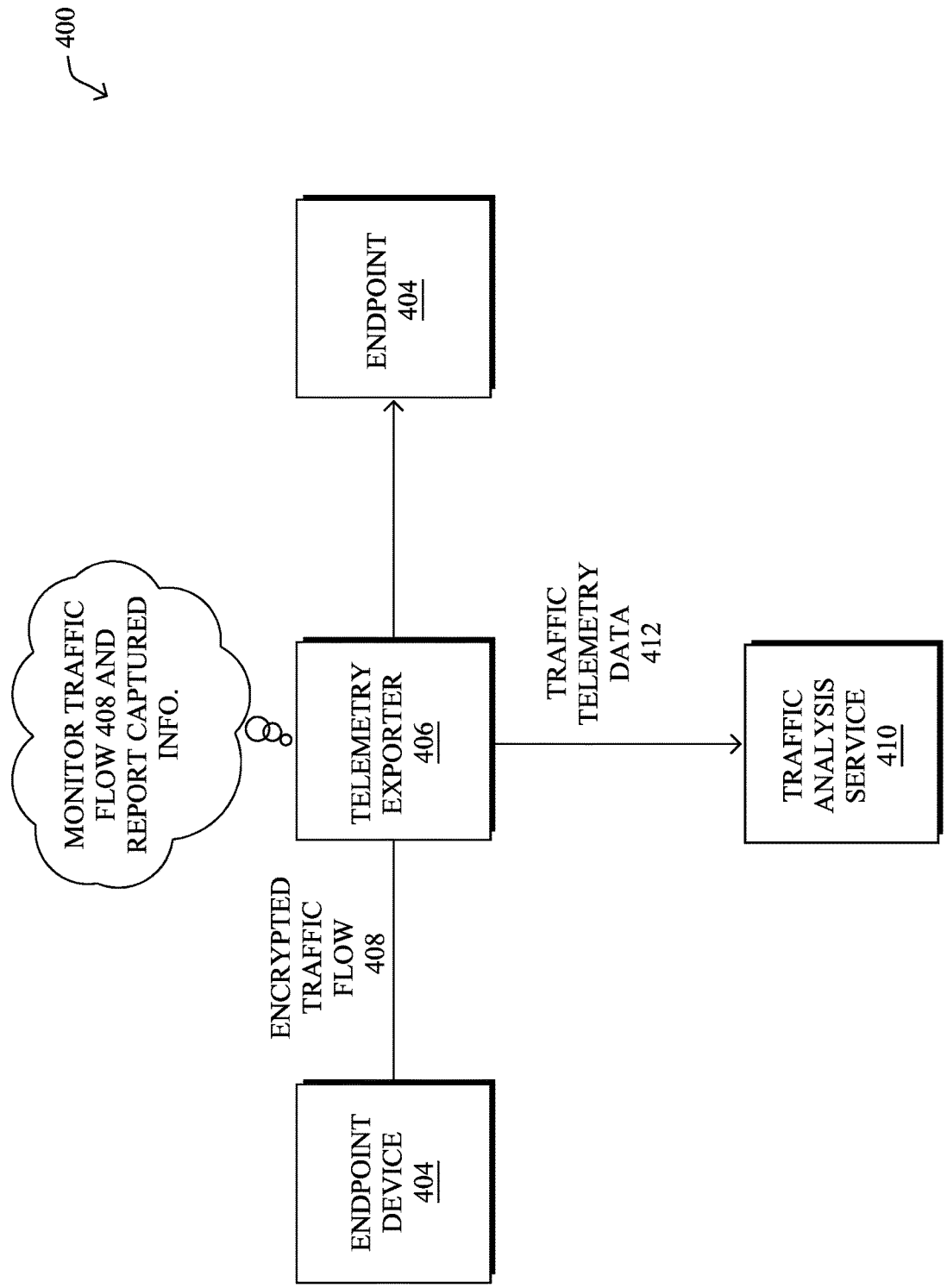

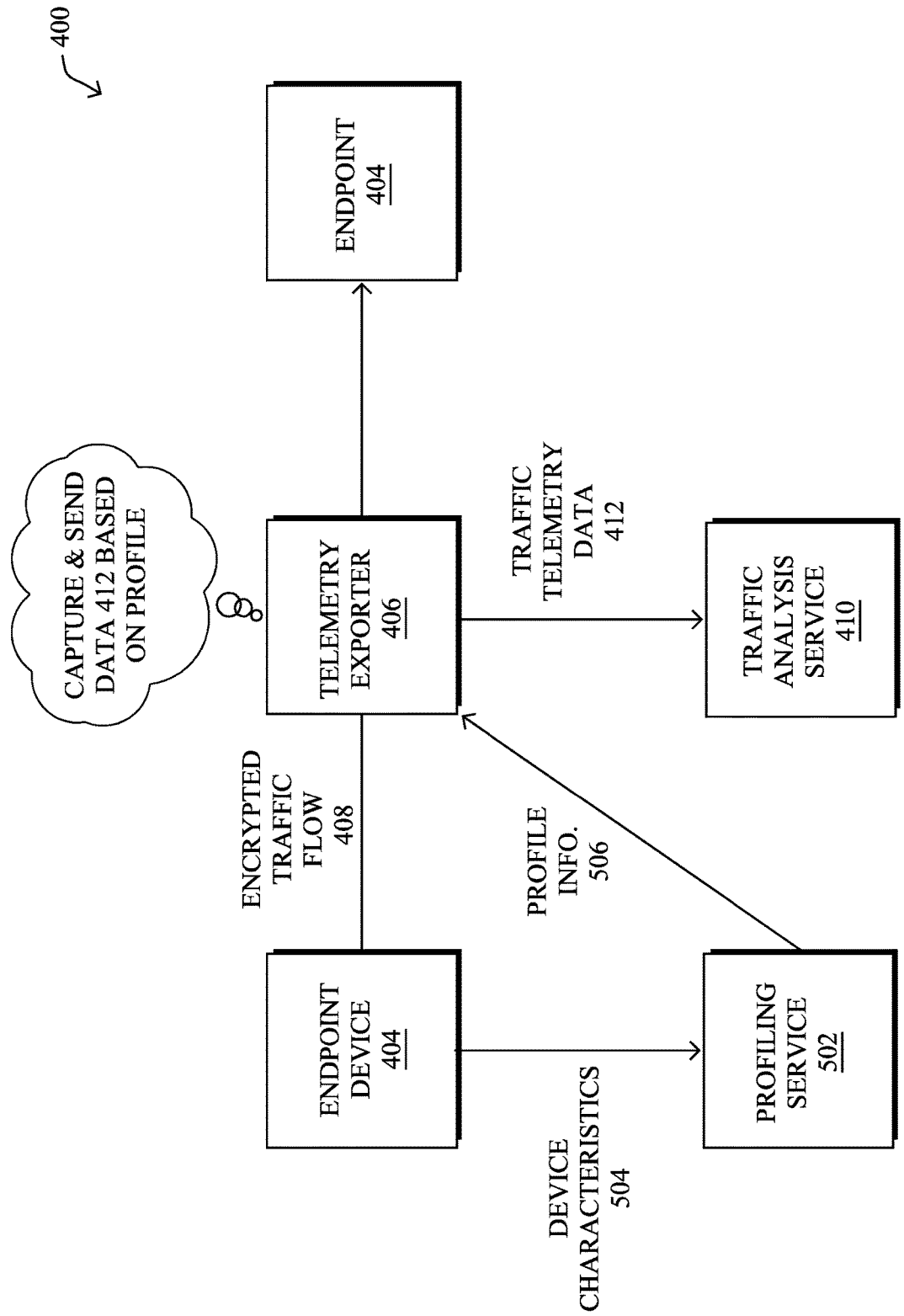

ENCRYPTED TRAFFIC ANALYSIS CONTROL MECHANISMS

TECHNICAL FIELD

The present disclosure relates generally to computer networks, and, more particularly, to encrypted traffic analysis control mechanisms.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices. However, many instances of malware now use encryption, to conceal their network activity from detection.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4B illustrate an example of the throttling of telemetry collection and reporting for encrypted traffic analysis;

FIG. 5 illustrates an example of enabling telemetry capture and exporting based on a device profile;

DESCRIPTION OF EXAMPLE EMBODIMENTS

Overview

Figure 1A:
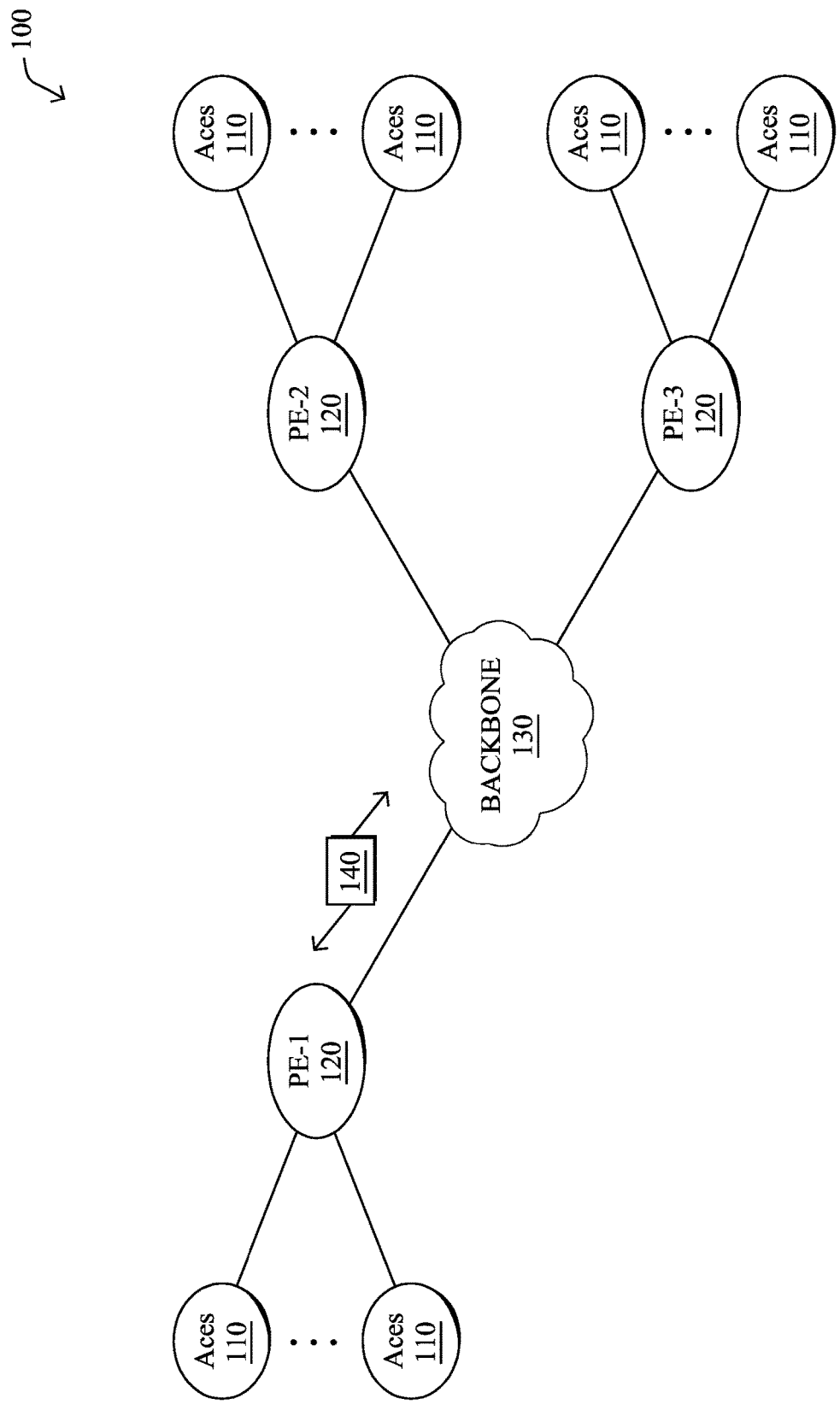
FIGS. 1A-1B illustrate an example communication network.

According to one or more embodiments of the disclosure, a service monitors collection of telemetry data by a telemetry exporter in a network. The telemetry exporter collects the telemetry data from a plurality of interfaces via which a plurality of encrypted traffic flows flow. The telemetry exporter also sends the collected telemetry data to a traffic analysis service for analysis. The service determines that a cost associated with the collection of the telemetry data by the telemetry exporter exceeds a cost threshold. The service selects a subset of the interfaces from which telemetry data is to be captured by the telemetry exporter, based in part on a determination that the cost associated with the collection of the telemetry data exceeds the cost threshold. The service controls the telemetry exporter to collect telemetry data to for a subset of the plurality of encrypted traffic flows using the selected subset of interfaces.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
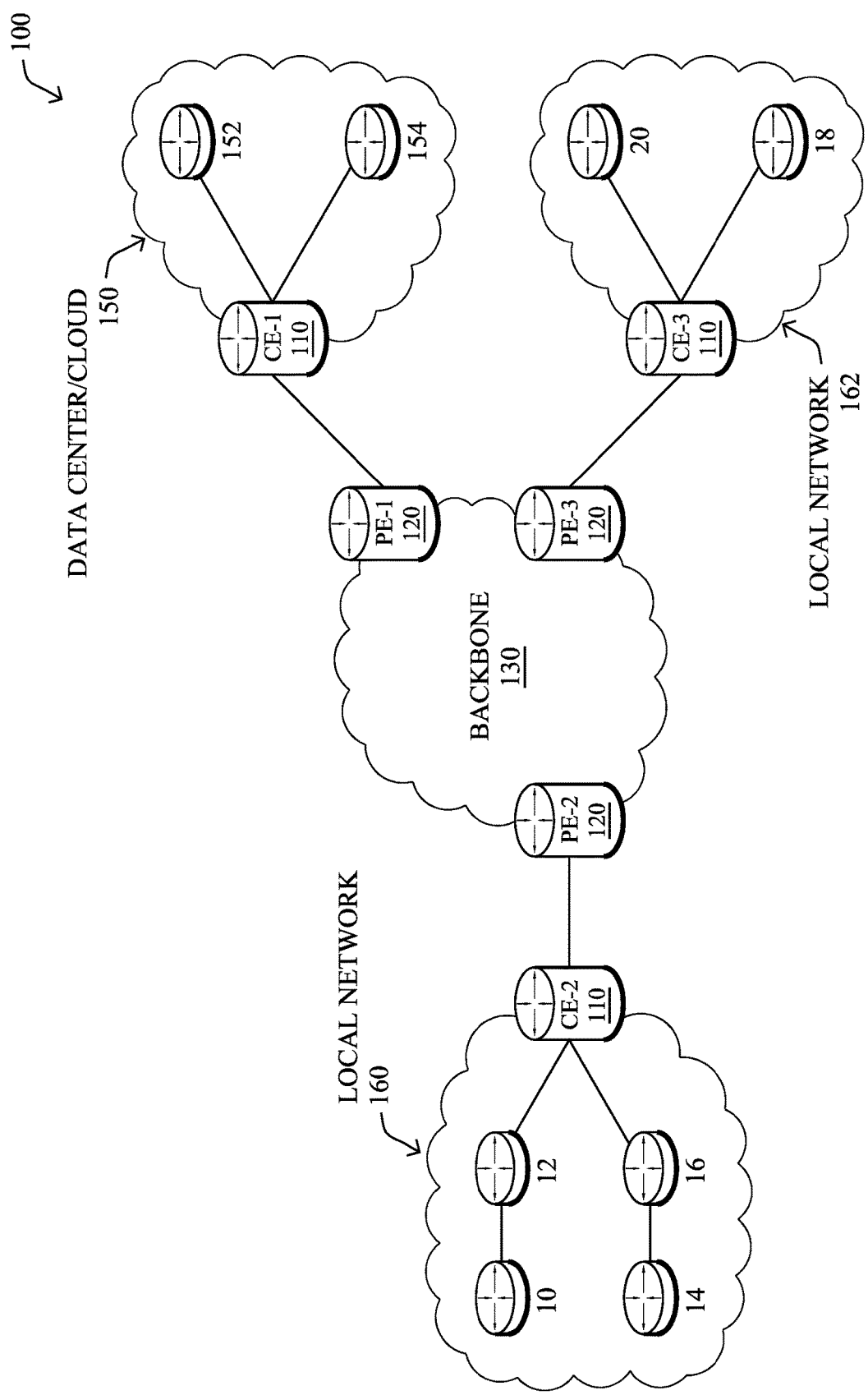

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
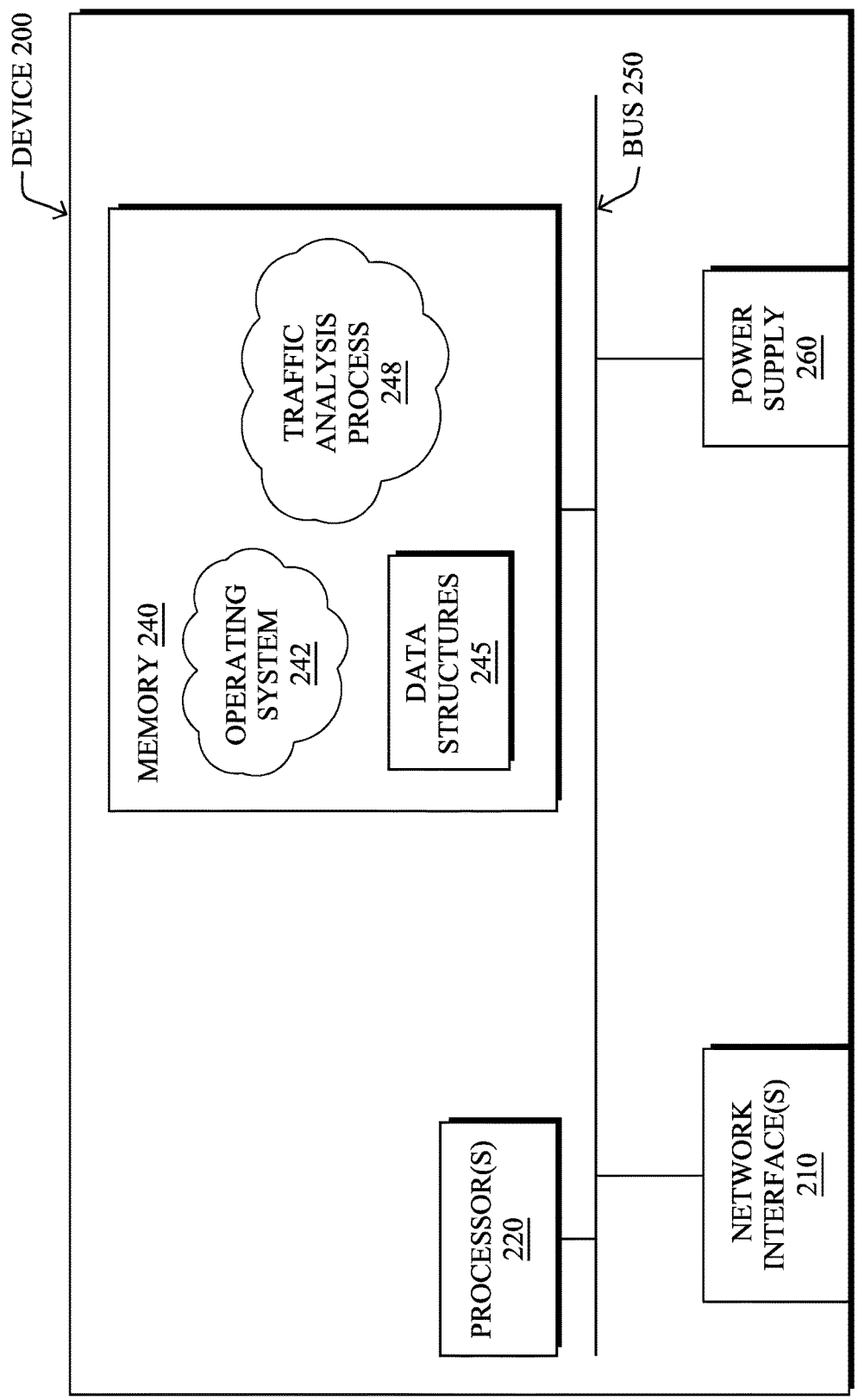
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify encrypted traffic in the network (and its originating application) for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
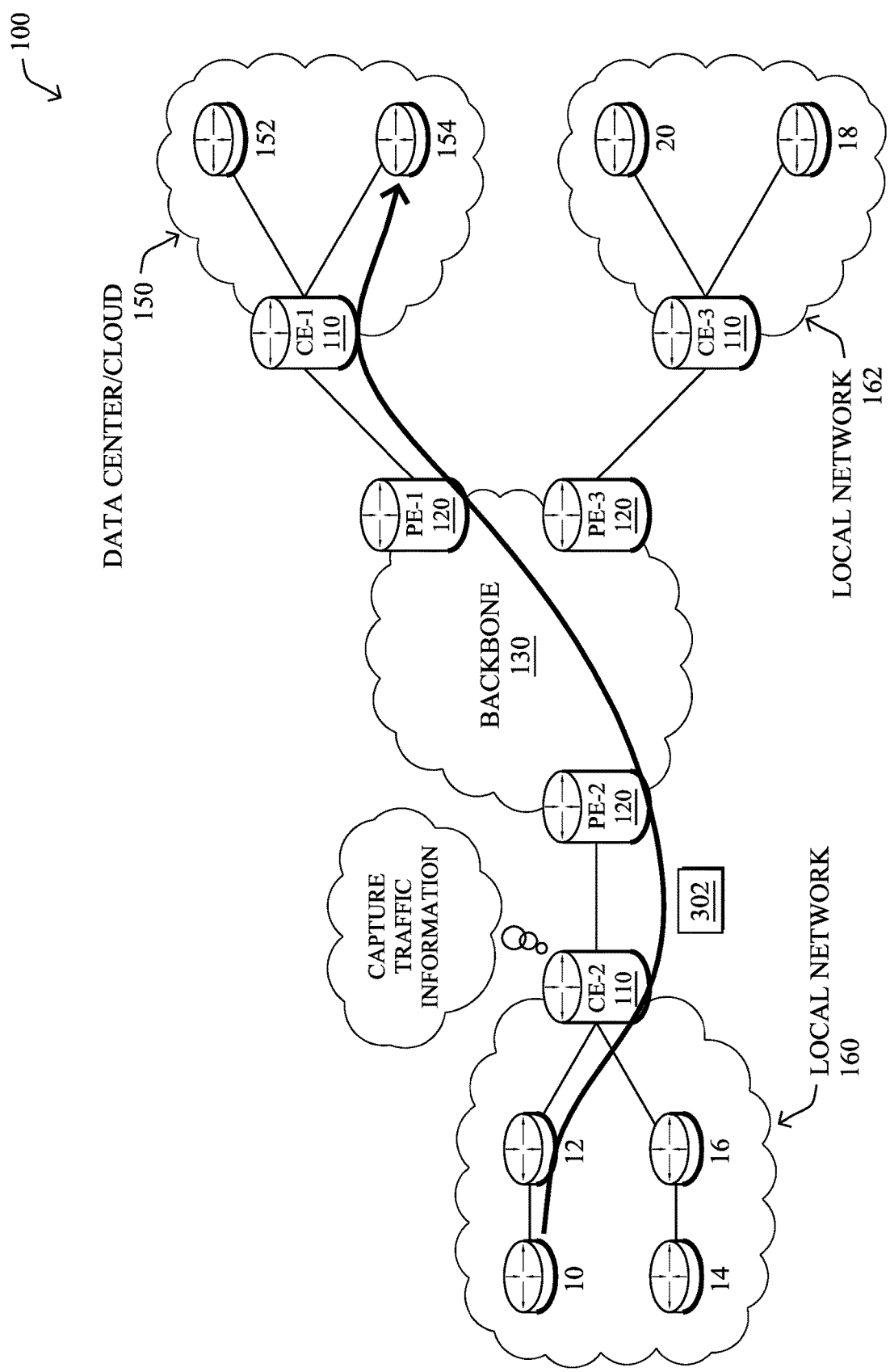
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.). However, as would be appreciated, a traffic flow may also be encrypted, thus preventing the device from assessing the actual payload of the packet. In such cases, the characteristics of the application can instead be inferred from the captured header information.

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, a traffic analysis service that analyzes encrypted traffic may collect intra-flow metadata, such as the TLS feature(s), SPLT information, and the like. In some cases, the service may also capture the initial data packet from the communication, to gain insight into the security strength of the communication transport, detect the presence of malware, and/or identify attempted data exfiltration in the encrypted traffic to command and control sites.

Each flow may be identified by the traffic analysis service by its key fields, such as: source IP, destination IP, source port, destination port, and/or protocol identifier (e.g., identified by its corresponding 5-tuple). Using this identification, captured traffic records may be sent to a flow collector associated with the analysis service under any or all of the following conditions: the connection is completed (e.g., a TCP FIN is encountered), an inactivity timer expired, the flow expired, or the flow cache expired. Typically, as noted, the initial data packet and SPLT information from the first ten packets in the flow are also captured and used as non-key fields to identify the flow.

As would be appreciated, the encrypted traffic analysis service introduced herein may gather and send a large volume of data. For example, a web browser will open at least one connection per tab, each with a different source port. Rendering a single web page also uses multiple connections, not all of which are to the same remote address, and none of them sharing the same source port. As any unique combination of the 5-tuple fields in the flow would produce a new flow, a typical web browsing activity generates a large number of flows to process at the collector.

There is a cost associated with collecting and processing information about each traffic flow under analysis. Notably, the telemetry exporter device (e.g., router, switch, dedicated telemetry exporter, etc.) has to monitor the flow, match the flow to the keys, and export the captured information about the flow. Traffic shaping can help manage the bandwidth required to export the flow, but there is still a CPU and memory cost to manage the flow. More importantly, certain telemetry exporters are licensed under terms that charge by the rate of flows per seconds that they process. In flexible Netflow and similar telemetry exporter systems, flow sampling could be used to reduce the load on the device by limiting the number of packets that are selected for analysis. For example, the telemetry exporter could be configured to monitor the $n^{th}$ packet in a request, or a random packet in the request. This will not reduce the rate of telemetry export to collector if there is a large number of unique flows and connections. However, a traffic analysis service that assesses encrypted traffic still may require the initial data packet of a flow, as well as SPLT information regarding the first x-number of packets in the flow export (e.g., SPLT information for the first ten flow packets, etc.). Thus, packet sampling approaches to reduce the amount of captured and exported telemetry data may not be usable for purposes of encrypted traffic analysis.

Encrypted Traffic Analysis Control Mechanisms

The techniques herein introduce a sampling and throttling mechanism for the collection of telemetry data to be analyzed by an encrypted traffic analysis service that add no additional packet processing cost for the sampling, while still preserving the flow data needed for purposes of analyzing the encrypted traffic. In some aspects, the techniques herein utilize telemetry data collected from a collector/telemetry exporter, to detect flow overload and centrally perform system-wide (global) flow management across devices. More specifically, the techniques herein allow for the dynamic throttling of flow collection/reporting using interval halving, or a similar approach, based on the data utilization versus a defined threshold. In turn, the link and collector utilization can be rebalanced, as needed.

Specifically, according to one or more embodiments of the disclosure as described in detail below, a service monitors collection of telemetry data by a telemetry exporter in a network. The telemetry exporter collects the telemetry data from a plurality of interfaces via which a plurality of encrypted traffic flows flow. The telemetry exporter also sends the collected telemetry data to a traffic analysis service for analysis. The service determines that a cost associated with the collection of the telemetry data by the telemetry exporter exceeds a cost threshold. The service selects a subset of the interfaces from which telemetry data is to be captured by the telemetry exporter, based in part on a determination that the cost associated with the collection of the telemetry data exceeds the cost threshold. The service controls the telemetry exporter to collect telemetry data from a subset of the plurality of encrypted traffic flows that use the selected subset of interfaces.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Figure 4B:
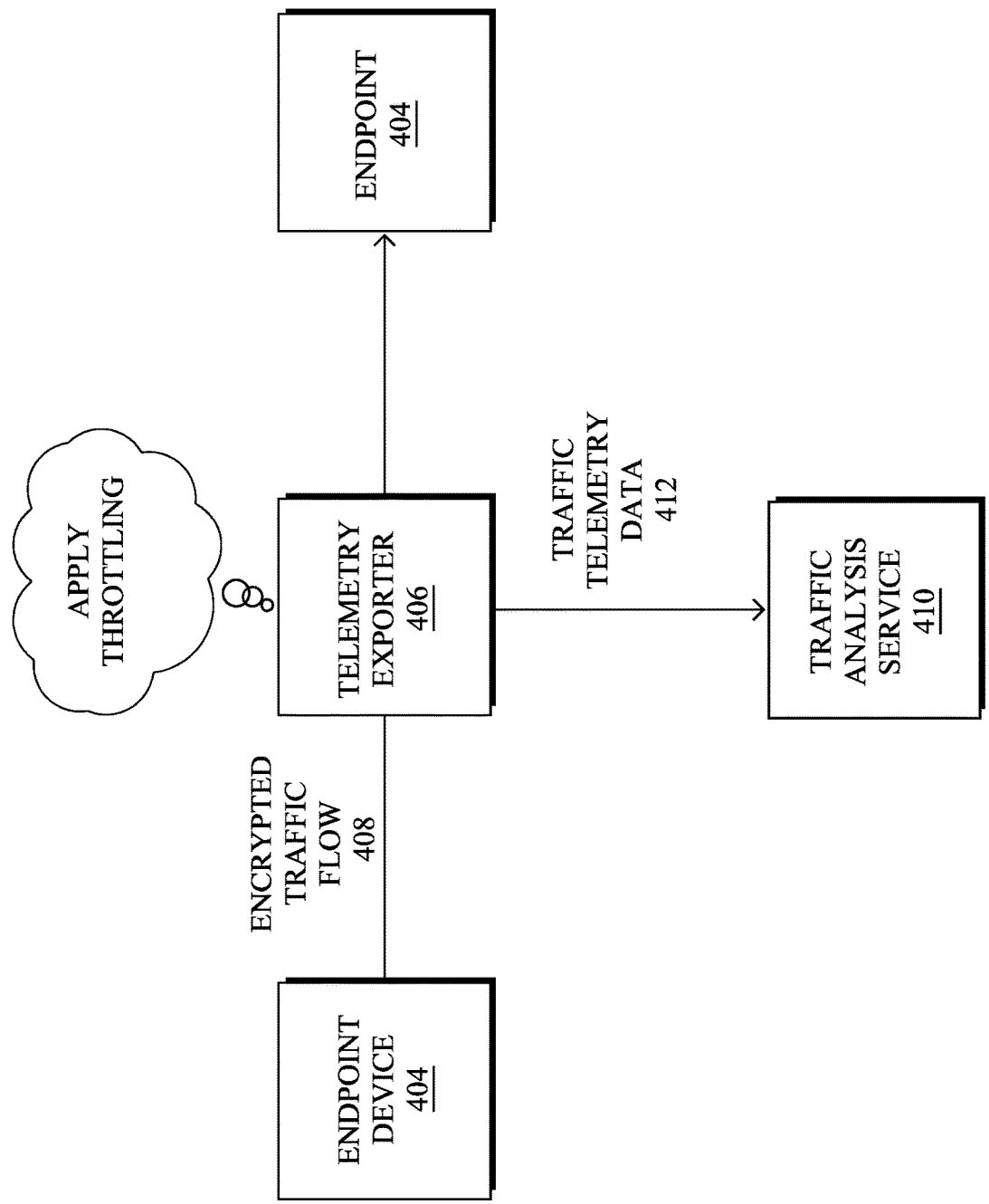

Operationally, FIGS. 4A-4B illustrate an example of the throttling of telemetry collection and reporting for encrypted traffic analysis, according to various embodiments. As shown in FIG. 4A, assume that a network 400 includes an endpoint device 402 in the local network under scrutiny that communicates with another remote endpoint 404. For example, in many cases, endpoint device 402 may be a client device that communicates with a remote server or service via network 400. More specifically, endpoint device 402 may form an encrypted traffic session with endpoint 404 and send encrypted traffic flow 408 towards endpoint 404 via network 400.

Located along the network path between endpoint device 402 and endpoint 404 may be any number of telemetry exporters, such as telemetry exporter 406 shown. For example, telemetry exporter 406 may be a switch, router, firewall, server, network controller, or other networking equipment via which encrypted traffic flow 408 sent between endpoint device 402 end endpoint 404 flows. During operation, traffic telemetry exporter 406 may capture data regarding encrypted traffic flow 408, generate traffic telemetry data 412 based on the captured data, and send traffic telemetry data 412 to traffic analysis service 410 for assessment. For example, traffic telemetry data 412 may include Internet Protocol Flow Information Export (IPFIX) records and/or Netflow records regarding encrypted traffic flow 408. In further cases, traffic telemetry data 412 may include one or more captured packets from encrypted traffic flow 408, such as the first n-number of data packets of flow 408.

In various embodiments, network 400 may also include a traffic analysis service 410 that is implemented by one or more devices in network 400 through the execution of traffic analysis process 248. For example, in some cases, traffic analysis service 410 may be implemented by one or more devices in the local network of endpoint device 402. However, in further cases, traffic analysis service 410 may be implemented as a cloud service that is in communication with telemetry exporter 406 and endpoint device 402, either directly or indirectly.

During operation, traffic analysis service 410 may make any number of assessments of encrypted traffic flow 408 without actually decrypting the flow. Notably, the characteristics of flow 408 can be used as input to one or more machine learning-based classifiers that are configured to make assessments such as whether flow 408 is malware-related (e.g., is propagating malware or malware commands), is attempting to exfiltrate data from the local network of client device 402, whether encrypted traffic flow 408 is using authorized security parameters (e.g., a particular TLS version, etc.) as part of a crypto audit, or for other determinations.

Based on the assessment of encrypted traffic flow 408 by traffic analysis service 412, traffic analysis service 412 may cause any number of mitigation actions to be performed in network 400. For example, traffic analysis service 412 may block or drop encrypted traffic flow 408. In more extreme cases, traffic analysis service 412 may prevent all future traffic in network 400 associated with endpoint device 402 and/or endpoint 404. In yet another example, traffic analysis service 412 may send a notification to a user interface that is indicative of the assessment of encrypted traffic flow 408 by traffic analysis service 412. For example, traffic analysis service 412 may notify a network administrator, if endpoint device 402 is suspected of being infected with malware.

Referring now to FIG. 4B, the techniques herein allow for the varying of the rate of sampling and telemetry reporting by telemetry exporter 406 to traffic analysis service 410. In various embodiments, the on and off durations of a portion of the interfaces/VLAN on telemetry exporter 406 used to capture flow information can be dynamically throttled, as described below.

In some cases, telemetry exporter 406 may be configured to expose application program interfaces (APIs) to publish information regarding its telemetry flow rate (e.g., as a measure of flow per second, etc.), the amount of flows that it receives from the respective device, and/or any other information relevant to the telemetry capture and reporting mechanisms of telemetry exporter 406. Using such APIs, traffic analysis service 410, or another supervisory service that oversees telemetry exporter 406, may use this reported information to potentially throttle the flow(s) at telemetry exporter 406 and/or adjust the sampling performed by telemetry exporter 406. For example, when the reported traffic telemetry data 412 exceeds a predefined threshold (e.g., in terms of reporting rate, size, equipment scale and cost, etc.), telemetry exporter 406 may be switched into a throttling mode.

In one embodiment, throttling by telemetry exporter 406 may be performed as follows. First, a normal distribution sampling of the interface(s)/VLAN(s) of telemetry exporter 406 may be determined. Then, a random function can be employed to select a random distribution of the interface(s)/VLAN(s), to determine which ones to turn on, for a duration of time. For instance, this can be achieved by counting the number of MAC addresses connected at the VLAN and interfaces, as well as the utilization at the interface, and then set the sampling duration per the count. Table 1 below illustrates an example of the resulting output of a vpp# show ip arp command for a representative device:

TABLE 1

| Time | FIB | IP4 | Flags | Ethernet | Interface |
| --- | --- | --- | --- | --- | --- |
| 346.3028 | 0 | 6.1.1.3 | | de:ad:be:ef:ba:be | GigabitEthernet2/0/0 |
| 3077.4271 | 0 | 6.1.1.4 | S | de:ad:be:ef:ff:ff | GigabitEthernet2/0/0 |
| 2998.6409 | 1 | 6.2.2.3 | | de:ad:be:ef:00:01 | GigabitEthernet2/0/0 |

The idea is to set the throttling according to the expected amount of samples. In further embodiments, other criteria could also be the number of arp cache entries corresponding to a given interface, and the size of cam table of the interface. The supervisory service will then program telemetry exporter 406 with the percentage time an individual interface and VLAN should be active, so as to schedule the on/off duration. In one embodiment, this may be done such that the active sampling duration is proportional to the population size. While connection happens in parallel, the number of packet that can fit on the available bandwidth, CPU and memory resource, etc. means not all packet from all MAC addresses are in fact concurrent, thus the queueing and time for the flow of the MAC addresses to leave the queue will be accounted for in this method to sample the interface/VLAN with a large number of host for longer duration.

In another embodiment, instead of randomly selecting which interface to enable, the supervisor of telemetry exporter 406 could also use even/odd rolling throttling of individual interfaces and VLANs. The same method to keep the interface active for flow sampling by traffic analysis service 410 for the duration proportional to utilization is used.

As a result of the interface/VLAN control, at any given time, some amount of interfaces/VLANs of telemetry exporter 406 may be in an enabled window, while other interfaces/VLANs of telemetry exporter 406 may be in a disabled window.

In some embodiments, the throttling will be trigger by cam and/or CPU resource thresholds defined by policy. For example, when CPU usage is above 85%, telemetry exporter 406 may start to throttle back the telemetry capture and/or export. In various embodiments, interval halving may be used to converge the number of interfaces and VLANs to enable at any particular time, to keep the rate of flow per second back from the threshold.

In other embodiments, the threshold can also be defined by the amount of flow exported to throttle the flow per second volume. For example, API access of telemetry exporter 406 can be used by the supervisor of exporter 406 to determine succinct flow statistics (amount, from which source), in a scalable manner. From there, it can determine that utilization of link, device resource, or flow per second license is at a defined threshold and throttle the device interfaces involved.

In one embodiment NETCONF may be used to program the on/off behavior of telemetry exporter 406. The supervisor may also set/change the collector of the flow to a different collector to balance the link and collector utilization, in further embodiments.

Note that the functionality of traffic analysis service 410 may also influence the throttling performed by telemetry exporter 406. For example, if traffic analysis service 410 performs a crypto audit to ensure that certain traffic is sufficiently encrypted, a small flow sample to traffic analysis service 410 would serve this purpose. If an application is used only one time on endpoint 402, and telemetry exporter 406 missed the sample, and the application is never used again, there is no further non-compliance issue. Conversely, if the application is used repeatedly by endpoint device 402, telemetry exporter 406 is likely to hit that sample at some point, from a probabilistic standpoint. Of course, if the crypto mechanism on endpoint device 402 is shared by multiple applications (e.g., a shared OS library such as openssl, etc.), then more than one application will use it and telemetry exporter will not need to sample all flows to perform the audit.

In another example, consider the case in which traffic analysis service 410 performs malware detection based on the encrypted traffic flow(s) associated with endpoint device 402. In such a case, most malware attempts to exfiltrate as much data as possible in a short amount of time and to infect as many machines as possible, quickly. This means that if a sample is missed, it will show up again because either the malware will reattempt the exfiltration or the malware will spread to another device at another interface. In either case, the sample will be picked up either at the re-enabled interface or by one of the other enabled interfaces of telemetry exporter 406.

As would be appreciated, existing sampling approaches attempt to first sample a packet and then apply a sampling function to the packet. If the packet does not match the sampling function, the packet can be discarded (e.g., if the packet match a given 5-tuple, or IP prefix/ACL, it can be discarded from being exported). However, these approaches still consume monitoring resources, to apply the sampling function. In addition, the techniques herein are still able preserve the initial data packet, as well as collect the SPLT information necessary for classification of an encrypted traffic flow. Notably, the techniques herein allow for the use of telemetry collected from the collector to detect flow overload and centrally perform system wide (global) flow management across devices. This allows for the dynamic throttling of flows (e.g., interval halving, etc.), based on utilization versus threshold, and to rebalance the link and collector utilization.

FIG. 5 illustrates an example of enabling telemetry capture and exporting based on a device profile, in various embodiments. Continuing the example of FIGS. 4A-4B, assume that network 400 includes endpoint device 402 that sends an encrypted traffic flow 408 to endpoint 404. During such a communication, an intermediate telemetry exporter 406 may be able to capture the initial data packet(s) of encrypted traffic flow 408 and/or other information regarding the flow (e.g., SPLT information regarding the flow, etc.) and export the captured telemetry data 412 to traffic analysis service 410 for analysis.

According to various embodiments, the decision as to whether telemetry exporter 406 should capture and/or export traffic telemetry data 412 may be based in part on the device profile of endpoint device 404. More specifically, this may entail assigning and aggregating impact weights to endpoint devices that best deliver the intent groups:

Group A (Crypto Audit)—The underlying intent here is for traffic analysis service 410 to assess the security strength of the communication transport, to minimize the risk of data compromise (leakage or modification) in transit. The cost-benefit and regulatory compliance focus is on the risk and nature of the transport. The endpoint host device may have relative immunity to malware (e.g., is a specialized, closed, not off-the-shelf system), but the intent is to still have traffic analysis service 410 make an assessment regarding how secure the communication link is associated with the device.

Group B (Malware Detection)—The underlying intent here is for traffic analysis service 410 to look for the presence of malware on an endpoint device, based on it encrypted traffic. In this scenario, not every endpoint device is of the same risk of contracting or spreading malware. Notably, there may be certain devices in the network (e.g., those using specialized, closed, not off-the-shelf systems) that have a very low risk of malware infection.

Endpoint host devices that are in Group A and Group B may be common, but often are not. In some aspects, the techniques herein leverage this fact to control the telemetry capturing and exporting by taking into account the tradeoff between device weighting and costs (e.g., capacity and/or licensing costs) against the benefits of examining traffic associated with a given endpoint device.

In some embodiments, network 400 may also include a profiling service 502 configured to determine the profile of endpoint device 404 based on the device characteristics 504 of endpoint device 404. In turn, the resulting profile information 506 can be used by telemetry exporter 406, to control whether telemetry exporter 406 should capture and report telemetry data 412 regarding encrypted traffic flow 408 to traffic analysis service 410.

In one embodiment, profiling service 502 may be part of an access control system within network 400 that determines device characteristics 504 such as, but not limited to, the user ID of the user operating endpoint device 404, the type of device 404 (e.g., make, model, etc.), the configuration of device 404 (e.g., in terms of software and/or hardware), and the like. For example, the Identity Services Engine (ISE) by Cisco Systems, Inc., and other similar systems, may be able to perform this device profiling.

In further embodiments, profiling service 502 may base its profiling of endpoint device 402 on Manufacturer Usage Description (MUD) information. Details regarding MUD can be found in the IETF draft entitled "Manufacturer Usage Description Specification" by E. Lear et al. In general, MUD allows information about a node to be included in a MUD file that is available from a MUD uniform resource indicator (URI), typically provided by the manufacturer of the node. In such a case, profiling service 502 may be a MUD controller or other intermediary capable of capturing the retrieved MUD information as device characteristics 504.

To select which flows are to be analyzed by traffic analysis service 410, the following steps may be performed:

1. Profile endpoint device(s)—This step gathers the OUI, hardware type, operating system, software information (e.g., browser, ports calling/listening), or other information pertaining to endpoint device 402, as detailed above. For example, profiling service 502 may be an ISE, MUD controller, or other service configured to gather and report this profiling information 506. As a result, this a table of host profiles connected at every edge interface. In turn, the host can be determined (e.g., MAC/EID) connected at every interface of telemetry exporter 406 connected at every interface from the network device ARP table. For example, this may result in the following host profile information:

---

HostProfileAtInterface:
[ { "intf", ge1, "hostProfile":"PC", "hostOS":"Windows Vista", ... },
{ "intf", ge2, "hostProfile":"Apple PC", "hostOS":"Mac OS X", ... },
{ "intf", vlan3, "hostProfile":"Nest", "hostOS": "Android", ... },
{ "intf", vlan4, "hostProfile":"DropCam", "hostOS":"Ubuntu", ... },
...;]

---

The interface could be a physical port, or a VLAN, supporting both wired and wireless devices. The example devices show above, which comprises a PC server, laptop, HVAC, and security camera, are commonly found in many network deployments.

2. Cross-reference Profile against Weighted List—In this step, the endpoint device profile may be compared against an aggregation of weighted lists. In one embodiment, a database of host OS and the associated common vulnerability scoring system (CVSS) score could be one such prioritized list. For example, continuing the above example of devices:

---

HostOSCVSS:
[
 • { "os" : "Android", "cvss" : 8 },
 • { "os" : "Window Vista", "cvss" : 7.9 },
 • { "os" : "Mac OS X", "cvss" : 7 },
 • { "os" : "Ubuntu", "cvss" : 6.3 },
]

---

Other weighted lists could also be formed based on the physical location of the end device (e.g., as determined by the WLC location feature, or network geolocation), whether the host accept user data feed (e.g., USB drive, download of software from untrusted source), risk and impact of data leakage, risk of infecting with a malware, and so on. For example, a data leakage impact list could be of the form:

---

DataLeakageImpact:
[ { "hostProfile" : "DropCam", "DataLeakage": "High" },
{ "hostProfile" : "Nest", "DataLeakage": "Low" },
Infectability:
[ { "hostProfile" : "DropCam", "Malware": "Low" },
{ "hostProfile" : "Nest", "Malware": "Low" },
{ "hostProfile" : "PC", "Malware": "High" },

---

In other embodiments, the login user or registered user of the endpoint device could also be factored in the weight list. For example, whether it is a corporate or guest owned device, could also be considered.

3. Identify aggregated weighted list per intent—Next, for each intent (e.g., crypto audit, malware detection, etc.), there is a corresponding aggregated weighted list. For example, the following could be used:

For intent Group A Crypto Audit, the aggregated weighted lists TargetedHosts=DataLeakageImpact×HostOSCVSS For intent Group B Malware Detection, the aggregated weight lists TargetedHosts=Infectability×HostOSCVSS To illustrate an example of how the above may be evaluated in an actual network:

The "DropCam" would be prioritized for a crypto audit by traffic analysis service 410, despite the fact that its OS has the best CVSS score amongst the others.

The "PC" would be prioritized for malware detection.

The "HVAC device/Nest" is not considered to be a priority for either intent, despite having a relatively bad CVSS score.

4. Identify Interfaces—In this step, the system may determine where best to enable interfaces for purposes of telemetry collection and analysis by service 410. For example, WhereBestToEnableAnalysis=HostProfileAtInterface×TargetedHosts would gives a list of interfaces in weighted priority that should be targeted for encrypted traffic inspection, as follows;

---

WhereBestToEnableETA:
[ { "intf", ge1 },
{ "intf", vlan4 },
:

---

5. Match Priority List to Collection Costs—In this step, the weighted priority list is matched against the flow per second license cost threshold, device resource/CPU, or maximum interface limits for encrypted traffic analysis criteria set by the administrator. Following the example above, "Nest" may thus be placed at the bottom of the list and dropped from consideration, based on the current cost threshold.

6. Enable Interface(s) for Telemetry Collection and Traffic Analysis—Based on the above, the system may then control the appropriate device(s), to cause those devices to collect telemetry data on the identified interfaces and initiate traffic analysis of the corresponding encrypted flows on those interfaces by traffic analysis service 410.

Figure 6:
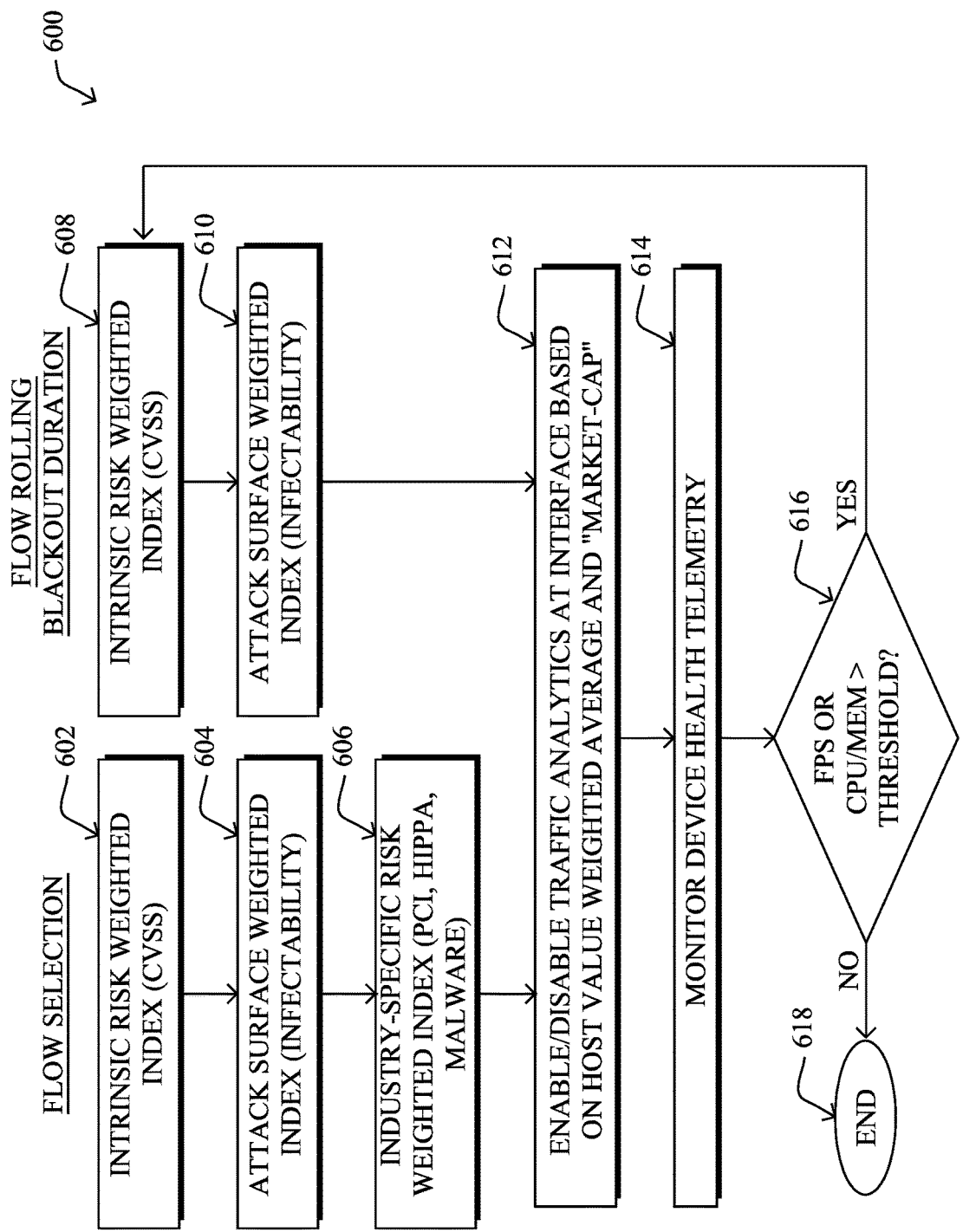
FIG. 6 illustrates an example flow diagram of employing encrypted traffic analysis control mechanisms.

FIG. 6 illustrates an example flow diagram 600 of employing encrypted traffic analysis control mechanisms, according to various embodiments. As shown in flow diagram 600, two primary mechanisms can be used to control which encrypted traffic flows are analyzed by a traffic analysis service in the network. Notably, these mechanisms may include determining whether a particular traffic flow should be analyzed, as well as a rolling blackout mechanism that adjusts the set of flows that may be analyzed at any given time.

With respect to individual flow selection, at step 602, the system may determine the intrinsic risk weighted index for the particular endpoint device under consideration. For example, the system may compute the CVSS for the endpoint device based on the profiling information for the endpoint device. Such profiling information may be obtained by a profiling service, such as an ISE, MUD controller, or the like, and identify the device type, device configuration, and/or other information that can be used to quantify CVSS score for the endpoint device.

At step 604, the system may also use the device profile information to calculate the attack surface weighted index of the endpoint device. Such an index may quantify the infectability of the endpoint device under consideration.

At step 606, the system may further use the device profile information to determine an industry-specific, risk weighted index for the endpoint device under scrutiny. Such an index may quantify the risk of a policy violation for the industry associated with the network deployment. For example, the policy may be specific to the payment card industry (PCI), may be a Health Insurance Portability and Accountability Act (HIPAA) policy, may be a malware-related policy, or the like.

Also as shown, a second control mechanism that the system may use to control which encrypted traffic flows are actually analyzed by the traffic analysis service is a "rolling blackout" mechanism, as detailed above. Notably, this mechanism may operate similar to rolling blackouts in an electric power grid, whereby only a subset of the available interfaces via which flow telemetry data can be captured are enabled for telemetry capture at any given time. This mechanism can be implemented on its own or, alternatively, in conjunction with the flow selection mechanism described above.

At step 608, the system may compute a market-capped weighted index that quantifies the current cost of the telemetry capture and flow analysis vis-à-vis a cost threshold. For example, such a cost may be based on the current resource load of the telemetry exporter or traffic analyzer (e.g., CPU load, etc.), the license terms (e.g., flow per second license terms), or the like. For example, such an index may be calculated based on the host value, as determined from steps 602-606, times the number of hosts outstanding at a port (ARP table).

At step 610, the system may perform interval halving, to disable some of the interfaces from which telemetry data is captured and then reported to the traffic analysis service.

At step 612, the system may enable or disable a given interface on the telemetry collector/exporter, based on the host value weighted average from steps 602-606 and/or the 'market cap' mechanism implemented in steps 608-610. For example, if the endpoint device associated with the interface is of high risk of malware infection and the flow rate per second is below a given threshold, the system may enable the corresponding interface on the telemetry exporter, in order for the traffic analysis service to make a malware assessment based on the encrypted traffic flow from the endpoint device.

At step 614, the system may monitor the health of the telemetry exporter in terms of flow rate per second (FPS), CPU load, memory consumption, or the like. If, at step 616, the system determines that the FPS, CPU load, memory consumption, etc. exceeds a defined cost threshold, the system may return processing back to step 608, in order to leverage the rolling blackout mechanism. In other words, the system may continue to perform interval halving until the cost associated with the telemetry capture and traffic analysis drops below the acceptable threshold. The process then ends at step 618.

Figure 7:
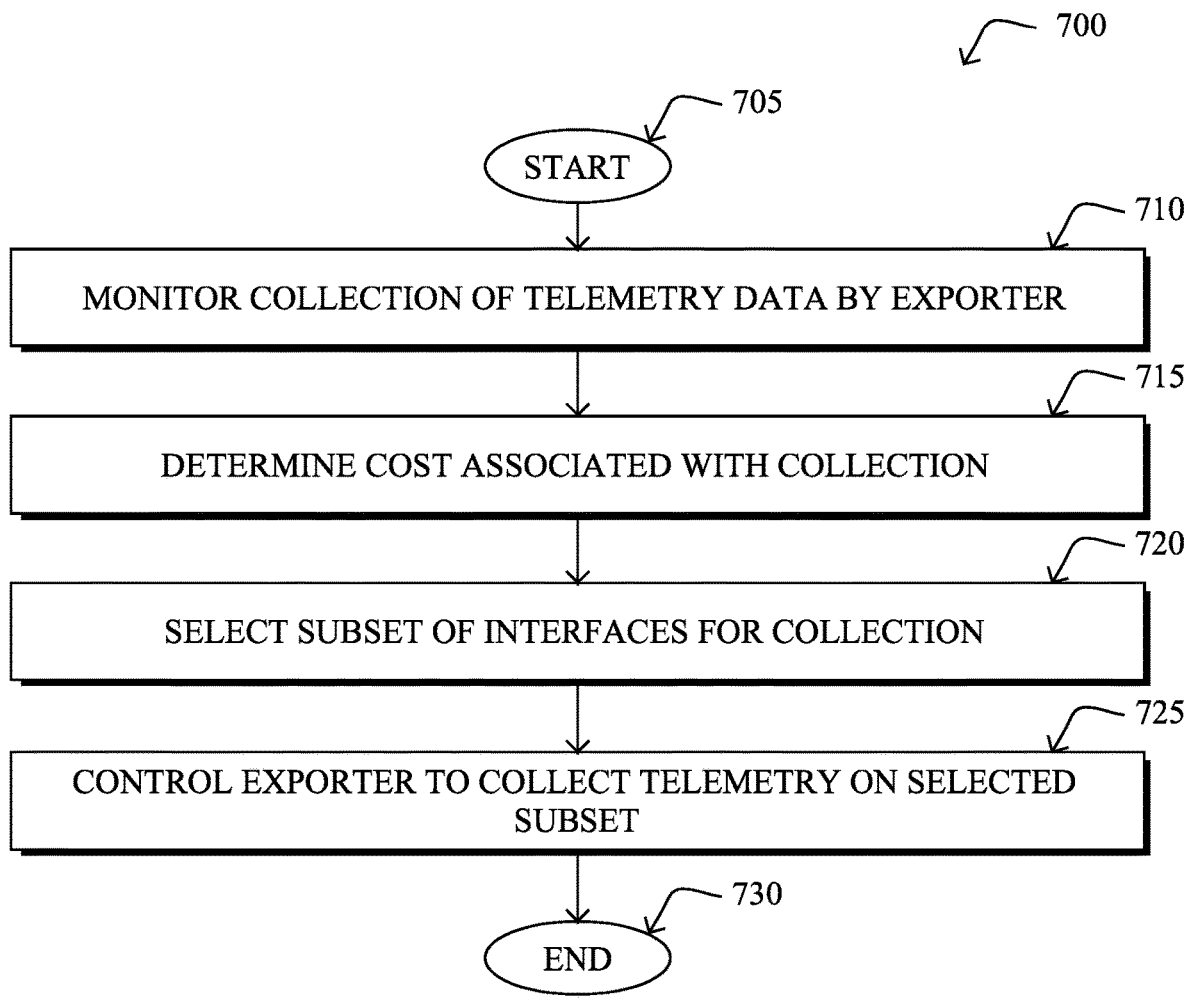
FIG. 7 illustrates an example simplified procedure for controlling encrypted traffic analysis in a network.

FIG. 7 illustrates an example simplified procedure for controlling encrypted traffic analysis in a network, in accordance with one or more embodiments described herein. For example, a non-generic, specifically configured device (e.g., device 200) may perform procedure 700 by executing stored instructions (e.g., process 248), to provide a service to the network. The procedure 700 may start at step 705, and continues to step 710, where, as described in greater detail above, the service may monitor collection of telemetry data by a telemetry exporter in a network. In various embodiments, the telemetry exporter collects the telemetry data from a plurality of interfaces, such as those of a router or switch, via which a plurality of encrypted traffic flows flow. In turn, the telemetry exporter sends the collected telemetry data to a traffic analysis service for analysis. The collected telemetry data may include the initial data packet(s) of the encrypted flow, SPLT or other information, or the like, that enable a machine learning-based classifier of the traffic analysis service to make an assessment of the encrypted flow, without having to actually decrypt the flow.

At step 715, as detailed above, the service may determine that a cost associated with the collection of the telemetry data by the telemetry exporter exceeds a cost threshold. For example, the cost may be a resource-based cost, such as CPU or memory consumption by the networking device (e.g., router, switch, etc.) associated with the telemetry exporter. In further embodiments, the cost may be a flow capture per second or other flow rate metric.

At step 720, the service may select a subset of the interfaces from which telemetry data is to be captured by the telemetry exporter, as described in greater detail above. In various embodiments, this selection may be based in part on a determination that the cost associated with the collection of the telemetry data exceeds the cost threshold. For example, if the cost exceeds the cost threshold, the service may begin using interval halving, to cause the telemetry exporter to only collect telemetry on a subset of the interfaces and on a rolling basis. In further embodiments, profiling data regarding a particular endpoint device can also be used to determine whether the telemetry exporter should export telemetry data captured from an interface that corresponds to the endpoint device. Such profiling can be obtained from a MUD file, monitoring the behavior of the endpoint device, or from any other source.

At step 725, as detailed above, the service may control the telemetry exporter to collect telemetry data from a subset of the plurality of encrypted traffic flows that use the selected subset of interfaces. Notably, the service may selectively control which encrypted traffic flows are actually assessed by the traffic analysis service, by controlling whether or not telemetry data is captured regarding the flows. This can be done in such a way so as to prioritize from which flows the telemetry data is captured, based on factors such as the endpoint device's susceptibility to malware, CVSS score, likelihood of violating a PCI or HIPAA policy, or the like. Procedure 700 then ends at step 730.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, introduce mechanisms that allow for the control of which encrypted traffic flows are evaluated by a traffic analysis service. Such mechanisms can be used to ensure that the devices involved in the process are not overloaded. In addition, these mechanisms can be used to prioritize endpoint devices for purposes of telemetry data collection and analysis of encrypted traffic flows by the traffic analysis service.

While there have been shown and described illustrative embodiments that provide encrypted traffic analysis control mechanisms, it is to be understood that various other adaptations and modifications may be made within the spirit and scope of the embodiments herein. For example, while certain embodiments are described herein with respect to using certain models for purposes of traffic analysis, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   monitoring, by a service, collection of telemetry data by a telemetry exporter in a network, wherein the telemetry exporter collects the telemetry data from a plurality of interfaces via which a plurality of encrypted traffic flows flow, and wherein the telemetry exporter sends the collected telemetry data to a traffic analysis service for analysis;
   determining, by the service, that a cost associated with the collection of the telemetry data by the telemetry exporter exceeds a cost threshold;
   selecting, by the service, a subset of the interfaces from which telemetry data is to be collected by the telemetry exporter based on profiling data of a particular endpoint device associated with a particular one of the selected interfaces, when a determination that the cost associated with the collection of the telemetry data exceeds the cost threshold; and
   controlling, by the service, the telemetry exporter to collect telemetry data only from the selected subset of interfaces among the plurality of interfaces,
   wherein the selecting of the subset of interfaces from which telemetry data is to be collected by the telemetry exporter comprises:
      identifying, by the service, the particular endpoint device associated with the particular one of the selected interfaces; and
      selecting, by the service, the particular interface for inclusion in the subset based on the profiling data of the particular endpoint device.

2. The method as in claim 1, wherein the telemetry data for a particular one of the encrypted traffic flows comprises a first packet of the particular flow and sequence of packet lengths and time (SPLT) data classifying the particular encrypted traffic flow.

3. The method as in claim 1, wherein the traffic analysis service analyzes the telemetry data using a machine learning-based classifier and without decrypting the encrypted traffic flows.

4. The method as in claim 1, wherein the cost associated with the collection of the telemetry data comprises at least one of: a central processing unit (CPU) load, a memory consumption, or a traffic flow rate per second.

5. The method as in claim 1, wherein selecting the particular interface for inclusion in the subset based on profiling data associated with the endpoint device comprises:
   determining, by the service, a common vulnerability scoring system (CVSS) score for the endpoint device, based on the profiling data.

6. The method as in claim 1, wherein selecting the particular interface for inclusion in the subset based on profiling data associated with the endpoint device comprises:
   determining, by the service, whether the endpoint device is likely to violate a payment card industry (PCI) or Health Insurance Portability and Accountability Act (HIPAA) policy.

7. The method as in claim 1, wherein selecting the subset of interfaces comprises:
   applying, by the service, interval halving to the collection of the telemetry data on a rolling basis among the interfaces.

8. The method as in claim 1, wherein the interfaces are interfaces of a network switch or router.

9. An apparatus, comprising:
   one or more network interfaces to communicate with a network;
   a processor coupled to the network interfaces and configured to execute one or more processes; and a memory configured to store a process executable by the processor, the process when executed configured to:
monitor collection of telemetry data by a telemetry exporter in a network, wherein the telemetry exporter collects the telemetry data from a plurality of interfaces via which a plurality of encrypted traffic flows flow, and wherein the telemetry exporter sends the collected telemetry data to a traffic analysis service for analysis;
determine that a cost associated with the collection of the telemetry data by the telemetry exporter exceeds a cost threshold;
select a subset of the interfaces from which telemetry data is to be collected by the telemetry exporter based on profiling data of a particular endpoint device associated with a particular one of the selected interfaces, when a determination that the cost associated with the collection of the telemetry data exceeds the cost threshold; and
control the telemetry exporter to collect telemetry data only from the selected subset of interfaces among the plurality of interfaces,
wherein the apparatus selects the subset of interfaces from which telemetry data is to be captured by the telemetry exporter by:
identifying the particular endpoint device associated with the particular one of the selected interfaces; and
selecting the particular interface for inclusion in the subset based on the profiling data of the particular endpoint device.

10. The apparatus as in claim 9, wherein the telemetry data for a particular one of the encrypted traffic flows comprises a first packet of the particular flow and sequence of packet lengths and time (SPLT) data classifying the particular encrypted traffic flow.

11. The apparatus as in claim 9, wherein the traffic analysis service analyzes the telemetry data using a machine learning-based classifier and without decrypting the encrypted traffic flows.

12. The apparatus as in claim 9, wherein the cost associated with the collection of the telemetry data comprises at least one of: a central processing unit (CPU) load, a memory consumption, or a traffic flow rate per second.

13. The apparatus as in claim 9, wherein the apparatus selects the particular interface for inclusion in the subset based on profiling data associated with the endpoint device by:
determining a common vulnerability scoring system (CVSS) score for the endpoint device, based on the profiling data.

14. The apparatus as in claim 9, wherein the profiling data is obtained via a Manufacturer Usage Description (MUD) file associated with the endpoint device.

15. The apparatus as in claim 9, wherein the apparatus selects the particular interface for inclusion in the subset based on profiling data associated with the endpoint device by:
determining whether the endpoint device is likely to violate a payment card industry (PCI) or Health Insurance Portability and Accountability Act (HIPAA) policy.

16. The apparatus as in claim 9, wherein the apparatus selects the particular interface for inclusion in the subset based on profiling data associated with the endpoint device by:
determining whether the traffic analysis service should perform a crypto audit or malware evaluation of the traffic associated with the endpoint device.

17. The apparatus as in claim 9, wherein the interfaces are interfaces of a network switch or router.

18. A tangible, non-transitory, computer-readable medium storing program instructions that cause a device in a network to execute a process comprising:
monitoring collection of telemetry data by a telemetry exporter in a network, wherein the telemetry exporter collects the telemetry data from a plurality of interfaces via which a plurality of encrypted traffic flows flow, and wherein the telemetry exporter sends the collected telemetry data to a traffic analysis service for analysis;
determining that a cost associated with the collection of the telemetry data by the telemetry exporter exceeds a cost threshold;
selecting a subset of the interfaces from which telemetry data is to be collected by the telemetry exporter based on profiling data of a particular endpoint device associated with a particular one of the selected interfaces, when a determination that the cost associated with the collection of the telemetry data exceeds the cost threshold; and
controlling the telemetry exporter to collect telemetry data only from the selected subset of interfaces among the plurality of interfaces,
wherein the selecting of the subset of interfaces from which telemetry data is to be collected by the telemetry exporter comprises:
identifying the particular endpoint device associated with the particular one of the selected interfaces; and
selecting the particular interface for inclusion in the subset based on the profiling data of the particular endpoint device.

* * * * *